Dec. 15, 1964   J. D. AMBURGEY   3,161,041
BALL MARKING DEVICE
Filed March 13, 1962   2 Sheets-Sheet 1
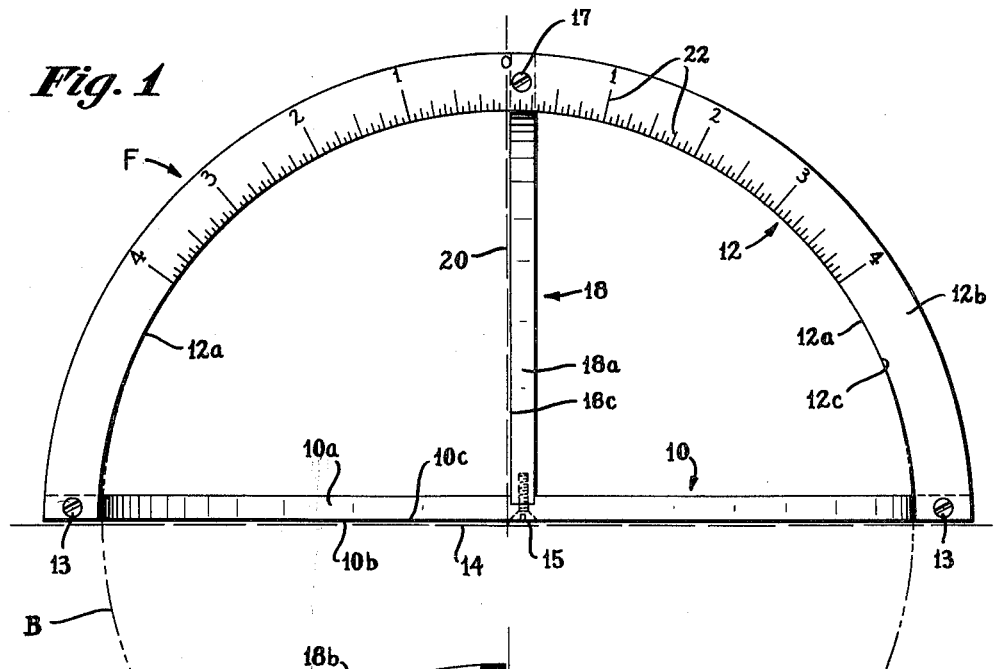
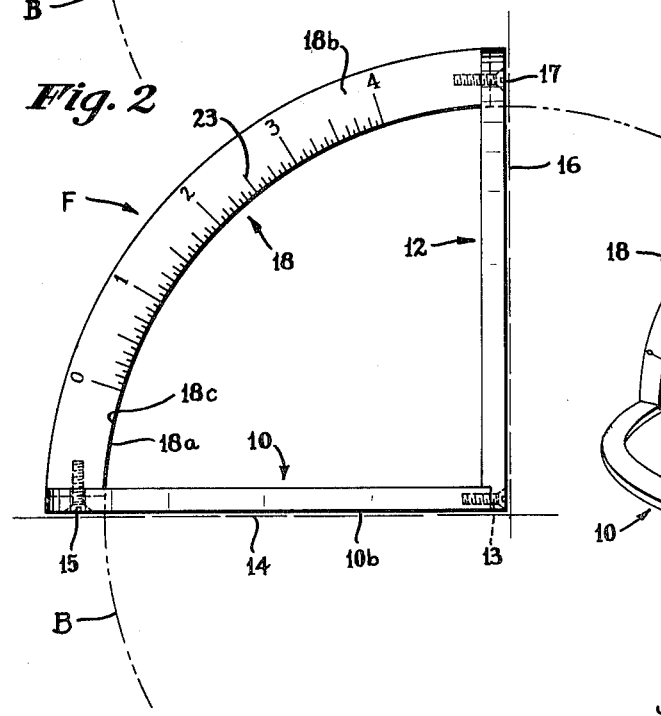
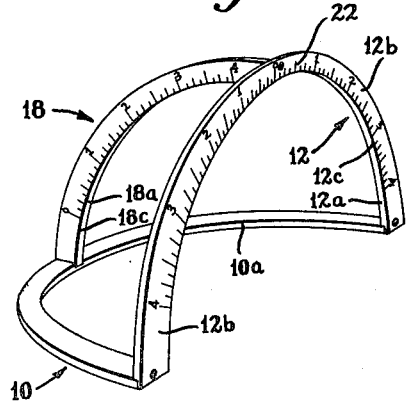
INVENTOR
J. D. AMBURGEY
BY Watson, Cole, Grindle & Watson
ATTORNEY Dec. 15, 1964        J. D. AMBURGEY         3,161,041
                     BALL MARKING DEVICE Filed March 13, 1962                        2 Sheets-Sheet 2

INVENTOR
J. D. AMBURGEY

BY Watson, Cole, Grindle & Watson
                              ATTORNEY

United States Patent Office 3,161,041
Patented Dec. 15, 1964

3,161,041
BALL MARKING DEVICE
Jay D. Amburgey, 1606 Alamosa, Odessa, Tex.
Filed Mar. 13, 1962, Ser. No. 179,446
2 Claims. (Cl. 73—65)

This invention relates to a ball marking device particularly adapted for use in marking and orienting bowling balls to provide coordinate markings thereon for use in accurately determining the proper location and disposition of the finger and thumb holes with respect to the center of gravity of the ball.

In the usual bowling ball adapted for use in the game of ten pins, the ball normally is so formed prior to the provision of the finger and thumb holes that its center of gravity is somewhat eccentric with respect to the geometrical center of the ball. This eccentric disposition compensates for the loss of weight on one side of the ball when the aforesaid holes are drilled. In order to provide an indication as to the heavy or so called top side of the ball containing its center of gravity or so called top weight, it is customary for the ball manufacturer to apply his label in such manner that its center is substantially coincident with the point of intersection of the radial projection of the center of gravity with the ball surface.

Thus in placing the finger and thumb holes, these are normally located with respect to the label, it customarily being attempted to so locate them, that the top weight or center of gravity of the ball is contained substantially within the plane in which the ball rolls when thrown in normal manner by the player. In fact however, the location of the label with respect to the center of gravity is but general or approximate in the usual bowling ball and in order to maintain proper balance of the completed ball when the finger and thumb holes are drilled, it is desirable to accurately locate the radial projection of the top weight onto the ball surface, as well as to accurately determine the positions of the finger and thumb holes with respect to the top weight.

The present invention provides a device which is adapted for use in combination with the ball support of a dodo scale to accurately ascertain the location of the radial projection of the center of gravity of the ball onto its surface.

Also, in accordance with the invention the said device is adapted to partially encompass the ball and to provide guide edges accurately positioned with respect to each other, for use in applying coordinate markings on the ball surface in the form of arcs of great circles, each at right angles to the others. The device is so arranged that it may be utilized to position such coordinate markings in any desired manner with respect to a given point on the ball surface, as for instance, the intersection of the radial projection of the center of gravity with such radial surface.

With these ends in mind, the invention is embodied in a unitary framework defining a spherically curved recess encompassing a portion of a sphere, preferably a quarter of the sphere, and in any event, less than half thereof, whereby the framework may be readily applied to and removed from a spherical bowling ball. The said framework is formed to provide marginal guide edges along and contiguous to three different great circles of a diameter similar to that of the bowling ball, with each of said great circles in a plane normal to the planes of the other two such great circles. Preferably two of the said guide edges are in the form of semi-circles, while the third such guide edge constitutes but a fragment of a circle and interconnects the mid points of the other such edges.

One of the semi-circular edges preferably is defined by a base portion of the frame which is adapted to rest upon the horizontal upper face of a conventional ball support of a dodo scale for use in combination with such scale for determining accurately the location on the ball surface of the radial projection of its center of gravity.

In the accompanying drawings, there is shown the preferred embodiment of the invention, together with illustrations of its preferred mode of use in conjunction with a bowling ball and bowling ball support. In said drawings:

FIGURE 1 represents a front elevation of a ball marking device embodying the invention showing how it is applied to a ball, the latter being shown fragmentarily in broken lines.

FIGURE 2 is a side elevation of the structure shown in FIGURE 1.

FIGURE 3 is a perspective view on a reduced scale of the device shown in the preceding figures.

Figure 4:
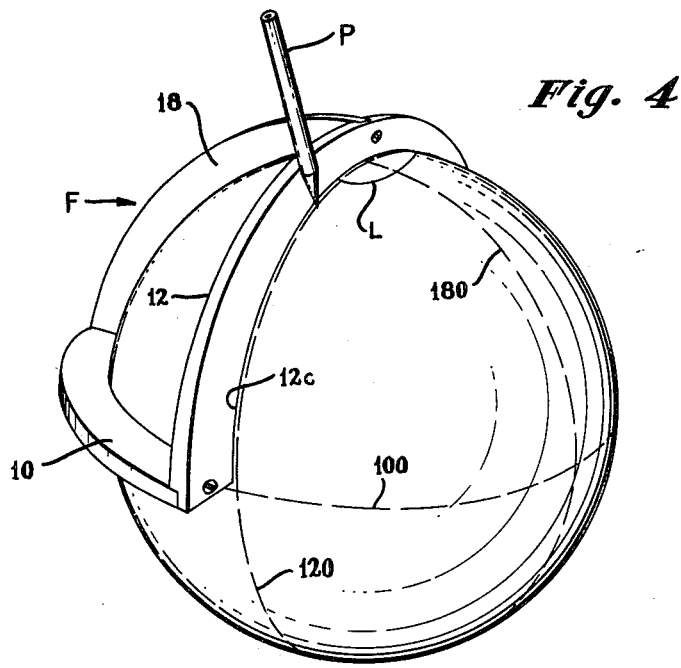
FIGURE 4 is a perspective view of the device of the invention showing how it is applied to a bowling ball for marking purposes.

Referring now in detail to the accompanying drawings and first considering FIGURES 1, 2 and 3, the ball marking device therein illustrated is in the form of a framework generally designated F which, in the present instance, is formed of several rigidly interconnected pieces. In the instant embodiment, the framework is formed to define a quarter of a spherical recess of an interior curvature corresponding to the surface curvature of a standard bowling ball designated as B. Obviously the framework may define somewhat more than the quarter of a spherical recess shown, the only limitation being that it should define not less than a quarter of the sphere and not more than one-half of a spherical recess to the end that it may be readily applied to and removed from the ball.

In the embodiment shown, the framework comprises a pair of rigid semi-circular frame members 10 and 12 each having a semi-circular inner periphery 10a, 12a respectively concentric to the recess and adapted for engagement with the ball surface. These members are rigidly interconnected at their ends as by means of the screws 13 in planes at right angles to each other. These members are provided with relatively remotely presented faces 10b and 12b respectively intersecting their said inner peripheries to provide guide edges 10c and 12c respectively at right angles to each other and contiguous to diametral planes through the spherical recess as indicated by the broken lines 14 and 16 respectively in FIGURE 2. It will be realized that the guide edges, by virtue of being thus contiguous to the diametral planes through the spherical recess will also be arranged to provide accurate guides for use with a pencil or other marking implement to accurately apply lines around the surface of a bowling ball in the form of great circles lying in diametral planes of the bowling ball.

A quadrant member 18 of arcuate shape extends between and rigidly interconnects the mid points of the said semi-circular members 10 and 12, being secured thereto by the screws 15 and 17 respectively in the preferred form of the invention. The member 18 has its arcuate inner periphery 18a concentric to the recess and cooperating with the inner peripheries 10a and 12a of the other members to define the said recess. The circumferentially presented face 18b of member 18 intersects its inner periphery 18a to define a third guide edge 18c contiguous to a diametral plane of said recess indicated by the broken line 20 which extends perpendicularly to both of said first mentioned planes and passes through the center of the spherical recess, as well as of a ball positioned therein.

It will thus be apparent that the edges 10c and 12c of the device in the present instance define the mouth of the recess for ready reception of the ball. By virtue of the structure of the framework as described to leave substantial open spaces or openings between the various members 10, 12 and 18, it is made possible to obtain a good view of the surface of a ball to which the device is applied, as well as to gain access to such surface for marking purposes.

In the use of the device, it is manually applied to the bowling ball in the manner illustrated in FIGURE 4 so that the ball may be readily marked by means of a pencil drawn along the respective guide edges 10c, 12c and 18c to mark on the surface of the ball three different great circles or portions thereof, designated as 100, 120 and 180 respectively in FIGURE 4. The arrangement is such that each of the great circles is at right angles to the other two and such that the several great circles thus formed may function as accurately positioned coordinate markings on the ball. Normally, and as shown in FIGURE 4, the ball is provided with a label designated L, which is so positioned by the manufacturer that its center will lie approximately at the intersection with the ball surface of a radial extension of the center of gravity of the ball. This particular location, by thus designating the side on which the center of gravity or top weight of the ball lies, makes it possible to apply the said coordinate markings in a manner that two of them as, for instance, 120 and 180 intersect at the center of the label. With this arrangement, it is made practical to locate the finger and thumb holes 24, 25 and 26 substantially in the manner indicated in FIGURE 6 in which the center of the thumb hole 26 will be seen to lie on the line 120, while the finger holes 24 and 25 lie symmetrically on opposite sides there. The said holes may be relatively spaced with respect to each other to accommodate the hand of a given player as regards both span and pitch. The great circles 100, 120 and 180 provide coordinate markings along which measurements may be taken to locate each of the said holes. Not only does the device facilitate the initial positioning of the holes to suit the measurements of a particular player while at the same time obtaining the proper balance in the ball, but in addition it will be apparent that by use of the device it will be made possible to readily duplicate the disposition of the holes of one ball in another.

The use of the device will be further facilitated by providing at least one of the semi-circular frame members 12 with calibrations 22 thereon. It has been found desirable in the instant embodiment to calibrate the face 12b of member 12 along its guide 12c, with the calibrations extending in opposite directions from the origin 0 and being in sixteenths of an inch. The quadrant member 18 may also be calibrated for purposes of convenience in measuring as at 23 in FIGURE 2, the calibrations here also being in sixteenths of an inch. It will be readily apparent that measurements may be made along any of the great circles on the ball simply by placing the guide edge 12a parallel thereto or alternatively may be made in directions at right angles to any such great surface by placing the guide edge 18c along and parallel to the desired great circle.

Figure 5:
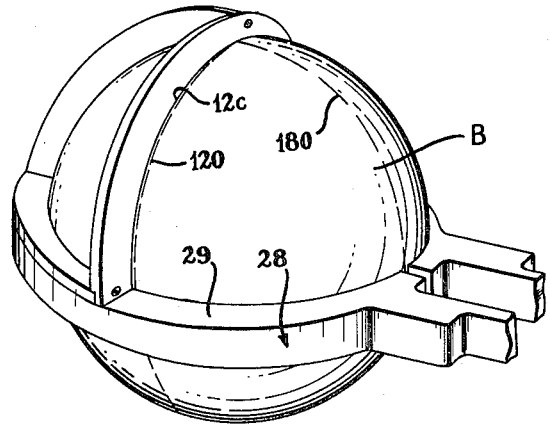
FIGURE 5 is a perspective view of the invention showing the manner in which the marking device is utilized in combination with the ball support of a dodo scale for use in conjunction with a ball supported on said scale.
Figure 6:
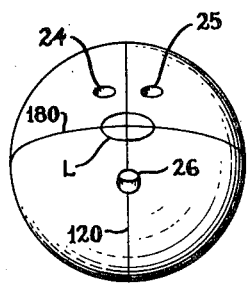
FIGURE 6 is a plan view on a reduced scale of a bowling ball marked by use of the device of the invention and showing the manner in which finger and thumb holes may be located by means of the invention.

The surface 10b of the semi-circular base member 10a preferably lies in a diametral plane with respect to the recess and to the ball, whereby to facilitate its use in conjunction with the ball holder of a usual dodo scale for determining accurately the location on the ball surface of the radial projection of the top weight of the ball, before drilling the finger and thumb holes therein. Thus referring to FIGURE 5, the ball B is shown operatively supported in a conventional ball holder 28 of a dodo scale, the holder as usual being generally of annular shape having an upwardly presented flat face or surface 29 lying in a horizontal plane passing through the center of the ball B supported in such holder. As is usual, the holder constitutes a portion of a weighing scale of specialized construction adapted to weigh but one half of the ball, namely a hemispherical portion thereof lying to one side of an imaginary vertical plane passing through the center of the ball. In order to thus locate the desired projection on the ball surface, the ball may be initially positioned with the great circle marking 120 contiguous to its guide edge 12c. First the half of the ball on one side of line 120 is weighed, following which the ball is rotated in the holder about a vertical axis for 180° whereupon the opposite side thereof is weighed. Then the scale is set to balance at the weight of the lightest side plus one-half of the difference in weight between the respective sides. The ball is then angularly adjusted in the plane of the marking 180 until the scale balances. It is then permitted to remain at rest while a line is drawn across the top of the ball along the edge 12c. This will give the position of the center of gravity of the ball in one plane, thereupon the ball may be rotated 90° to bring the great circle marking 180 adjacent and parallel to the guide edge 12c and the process is repeated, with the final marking across the top of the ball then normally intersecting the first mentioned marking at a point which will be coincident with the radial extension of the center of gravity or top weight of the ball. This intersection may be permanently marked, as by means of a punch, if desired, following which the finger holes and thumb hole may be applied with respect to this point in the manner indicated in FIGURE 6 of the drawings. In the event the center of gravity, when radially extended, is at the center of the label then the result will be substantially as shown in FIGURE 6. However, in the event the label L is inaccurately positioned, it will obviously have its center located eccentrically to the intersection between the planes of the great circles 120 and 180.

In this application I have shown and described only the preferred embodiment of my invention simply by way of illustration of the preferred mode of practice of my invention. However, I realize that the invention is capable of other embodiments and that its several details may be modified in various ways, all without departing from the invention. Accordingly the drawings and description herein are to be considered as merely illustrative in nature and not as restricting the scope of the invention other than as specifically required by the dependent claims.

Having thus described my invention, I claim:

1. Apparatus for locating on the surface of a bowling ball a radial extension of an eccentrically located center of gravity of said ball comprising a spherically curved open framework defining a quarter of a spherical recess for reception of a portion of said ball, said framework comprising a pair of semicircular members each having a semicircular inner periphery concentric to said recess, said members being rigidly interconnected and having relatively remotely circumferentially presented faces intersecting their said inner peripheries to provide guide edges in planes at right angles to each other and contiguous to diametrical planes through said spherical recess, in combination with a dodo scale for weighing only a hemispherical portion of a bowling ball lying to one side of an imaginary vertical plane passing through the center of the ball, said scale including a ball holder of annular configuration in a horizontal plane for supporting said ball in any desired position of rotation about its said center, said ball holder having an upwardly presented horizontal flat surface disposed about the ball in the horizontal plane of said ball center, one of said semicircular members having its said remote face slidably supported on and in registering relation with a portion of said flat surface, for movement around said surface to accurately position the remote face of the other said semicircular member in contiguous relation to said imaginary vertical plane.

2. Apparatus as defined in claim 1 in which said framework further includes a quadrant member rigidly connecting said semicircular members, and having an inner periphery concentric to said recess, and a circumferentially presented face intersecting its said inner periphery to define a third guide edge contiguous to a diametrical plane of said recess perpendicular to both of said first mentioned planes, whereby the intersections of the said planes contiguous to the other said semicircular member and to said quadrant member will be in vertical alignment with the center of a ball operatively supported in said holder.

References Cited by the Examiner
UNITED STATES PATENTS

| | | | |
|---|---|---|---|
| 1,175,612 | 3/16 | Cresse | 33—21 |
| 2,349,394 | 5/44 | Widdis | 33—174 X |

ISAAC LISANN, *Primary Examiner.*